US008768524B2

(12) United States Patent
Hammonds et al.

(10) Patent No.: US 8,768,524 B2
(45) Date of Patent: Jul. 1, 2014

(54) SYSTEM AND METHOD FOR RAPID RECONFIGURATION OF POST-MIX BEVERAGE DISPENSER

(75) Inventors: Marcus Hammonds, New Rochelle, NY (US); Fernando Ubidia, Ludlow, MA (US); John F. Lewis, Monson, MA (US)

(73) Assignee: PEPSICO, Inc., Purchase, NY (US)

( * ) Notice: Subject to any disclaimer, the term of this patent is extended or adjusted under 35 U.S.C. 154(b) by 88 days.

(21) Appl. No.: 13/101,285

(22) Filed: May 5, 2011

(65) Prior Publication Data

US 2011/0301768 A1 Dec. 8, 2011

Related U.S. Application Data

(60) Provisional application No. 61/351,403, filed on Jun. 4, 2010.

(51) Int. Cl.
*G05D 11/16* (2006.01)
*B67D 7/30* (2010.01)

(52) U.S. Cl.
USPC .............................. 700/285; 222/14; 718/107

(58) Field of Classification Search
USPC ............................ 700/285; 222/145.6; 62/68
See application file for complete search history.

(56) References Cited

U.S. PATENT DOCUMENTS 4,493,441 A 1/1985 Sedam et al.
4,898,303 A 2/1990 Large et al.
5,305,923 A 4/1994 Kirschner et al.
5,312,017 A * 5/1994 Schroeder et al. .............. 222/23
6,505,758 B2 1/2003 Black et al.
6,625,993 B2 * 9/2003 Frank et al. ........................ 62/68
6,981,615 B2 * 1/2006 Tobler ........................ 222/129.1
7,077,290 B2 7/2006 Bethuy et al.
7,156,259 B2 1/2007 Bethuy et al.
7,798,367 B2 * 9/2010 Minard et al. ............. 222/145.6
2001/0019067 A1 * 9/2001 Durham et al. ............ 222/129.1
2004/0084475 A1 5/2004 Bethuy et al.
2005/0035152 A1 2/2005 Bethuy et al.
2006/0237479 A1 10/2006 Fox
2007/0207040 A1 9/2007 Hughes et al.
2008/0029541 A1 2/2008 Wallace et al.

(Continued)

FOREIGN PATENT DOCUMENTS

CA 2032008 1/1995
EP 0181450 7/1989

(Continued)

OTHER PUBLICATIONS

Partial International Search Report for PCT/US2011/038997 dated Jul. 29, 2011.

(Continued)

*Primary Examiner* — Sean Shechtman
(74) *Attorney, Agent, or Firm* — Banner & Witcoff, Ltd.

(57) ABSTRACT

A beverage dispenser receives a fluid container at an installation position and includes a data reader configured to scan product indicia on an installed container. Based on data from that scan data, a controller operates a pump and a valve to mix beverage concentrate from the installed container with a diluent that corresponds to the desired beverage. The controller mixes the concentrate and diluent at a ratio that is based on the scan data. The controller may also select the correct diluent based on the scan data.

13 Claims, 9 Drawing Sheets

(56) References Cited

U.S. PATENT DOCUMENTS

| | | | |
|---|---|---|---|
| 2008/0283550 | A1 | 11/2008 | Nighy et al. |
| 2008/0302818 | A1 | 12/2008 | Minard et al. |
| 2008/0314926 | A1 | 12/2008 | Kumar et al. |
| 2009/0069930 | A1 | 3/2009 | Peters et al. |
| 2009/0069934 | A1 | 3/2009 | Newman et al. |
| 2009/0069949 | A1 | 3/2009 | Carpenter et al. |
| 2009/0159612 | A1 | 6/2009 | Beavis et al. |

FOREIGN PATENT DOCUMENTS

| | | |
|---|---|---|
| EP | 0433753 | 6/1991 |
| EP | 1489042 | 12/2004 |
| GB | 2416757 | 2/2006 |
| JP | 62-109797 | 5/1987 |
| JP | 6-508328 | 9/1994 |
| JP | 200099822 | 4/2000 |
| JP | 2006/143277 | 6/2006 |
| JP | 2009/522183 | 6/2009 |
| WO | 9222493 | 12/1992 |
| WO | 2007070032 | 6/2007 |

OTHER PUBLICATIONS

International Search Report and Written Opinion for PCT/US2011/038997, mailed Nov. 14, 2011.

Patent Examination Report No. 1 in AU2011261320 dated Jun. 19, 2013.

Notification of the First Office Action in CN201180035114.4 dated Sep. 29, 2013.

Office Action in JP2013-513359 dated Dec. 24, 2013, with English translation.

* cited by examiner

SYSTEM AND METHOD FOR RAPID RECONFIGURATION OF POST-MIX BEVERAGE DISPENSER

CROSS-REFERENCE TO RELATED APPLICATIONS

This application claims priority to Provisional U.S. Patent Application Ser. No. 61/351,403, filed Jun. 4, 2010, and titled "System and Method for Rapid Reconfiguration of Post-Mix Beverage Dispenser," which application in its entirety is incorporated by reference herein.

BACKGROUND

Post-mix beverage dispensers are widely used in restaurants, food stores and other retail establishments to provide self-service dispensing of a wide variety of carbonated and non-carbonated beverages. In a typical installation, a dispenser tower, merchandiser housing or other large unit has numerous pour stations. Each pour station may be assigned to a particular beverage and have fluid lines connecting the pour station to a source of a chilled diluent (e.g., water or carbonated water) and to a source of syrup or some other type of concentrated fluid for the assigned beverage. A customer uses a pour station by pressing a manual button or by pushing a cup against a cup-sensing lever. This actuates a pump motor and/or valve(s) so as to mix the diluent and beverage concentrate and deliver a beverage from a nozzle of the pour station.

On occasion, it is desirable to reconfigure a pour station of a post-mix beverage dispenser so that a different beverage is dispensed. As but one example, a first beverage dispensed from a first pour station might be in high demand, but a second beverage dispensed from a second pour station may be much less popular. It might thus be more profitable to forego sales of the second beverage and dispense the first beverage from both the first and second pour stations. Reconfiguring a pour station to dispense a different beverage can be time consuming, however. Different beverage concentrates have different viscosities and/or may require different ratios of concentrate to diluent for a dispensed beverage. These differences can require that pumps or other components in the pour station be adjusted based on the specific concentrate to be used. Some beverages may require a different diluent than other beverages (e.g., carbonated water vs. non-carbonated water) and thus require appropriate adjustment to mix the new beverage concentrate with the correct diluent. It may also be necessary to clean the fluid path(s) associated with a pour station when reconfiguring that station to dispense a different beverage. In addition to sanitary concerns, cross contamination between the old and new beverage concentrate can adversely affect product quality. For example, the old beverage may be dark in color, but the new beverage may be clear. Remnants of the old beverage concentrate in the fluid flow path can discolor the new beverage.

Conventionally, changing the beverage dispensed at a particular pour station has often required that a business schedule a service call from a dispenser technician. In addition to costs that may be associated with such a service call, a technician may not be available for a day or more. Delay in reconfiguring a dispenser pour station can result in lost profits to the business.

SUMMARY

This Summary is provided to introduce a selection of concepts in a simplified form that are further described below in the Detailed Description. This Summary is not intended to identify key features or essential features of the invention.

In at least some embodiments, a beverage dispenser is configured to receive a fluid container at an installation position within the beverage dispenser housing. The dispenser includes a data reader that is configured to scan product indicia on an installed fluid container and communicate scan data to a controller. Based on that scan data, the controller operates flow control devices to mix beverage concentrate from the installed container with a diluent that corresponds to the desired beverage. The controller mixes the concentrate and diluent at a ratio that is based on the scan data. The controller may also select the correct diluent based on the scan data.

DETAILED DESCRIPTION

Figure 1:
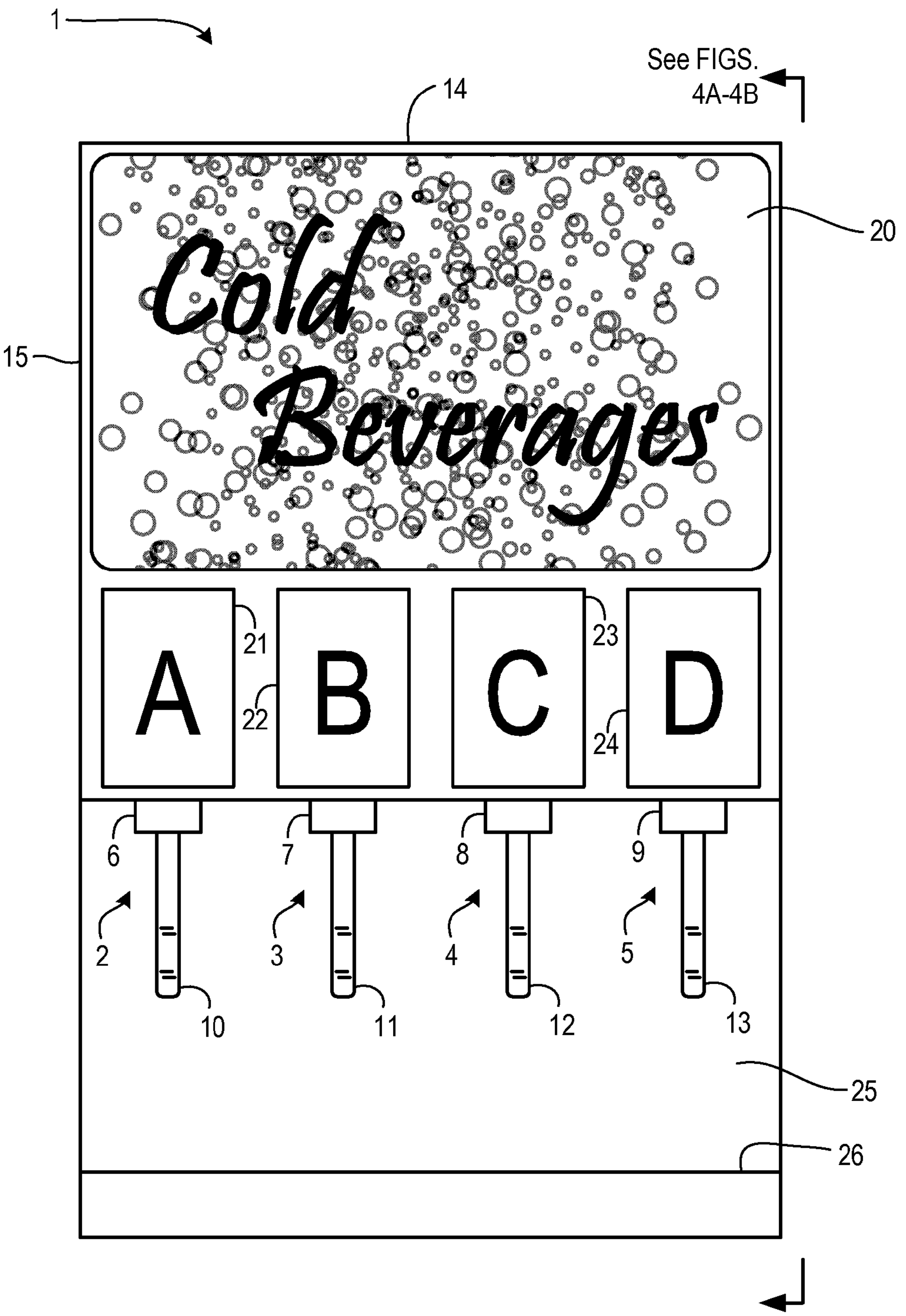
FIG. 1 is front elevational view of a post-mix beverage dispenser according to at least some embodiments.

FIG. 1 is front elevational view of a post-mix beverage dispenser 1 according to at least some embodiments. In the present example, dispenser 1 is configured to dispense four different beverages. For convenience, subsequent portions of this description will refer to those beverages as "beverage A," "beverage B," "beverage C" and "beverage D." Each of beverages A through D is a mixture of a specific liquid concentrate (e.g., a beverage syrup) and a corresponding diluent. Depending on the beverage in question, the corresponding diluent may be carbonated or non-carbonated water.

Dispenser 1 includes four pour stations 2, 3, 4 and 5. Each of stations 2, 3, 4 and 5 includes a corresponding dispensing nozzle (labeled 6, 7, 8 and 9, respectively) and a corresponding cup-sensing lever (labeled 10, 11, 12 and 13, respectively). Although not shown in FIG. 1, each of stations 2-5 further includes a corresponding dispensing module that includes a water valve and a carbonated water valve. Each dispensing module also includes a switch that is coupled to the cup-sensing lever of the corresponding station. As used herein, "coupled" includes two elements that are attached directly or by one or more intermediate elements. A controller, which is not shown in FIG. 1 but is discussed below, stores data indicating how fast pumps associated with the dispensing modules should pump concentrate and whether the beverage dispensed through each station is carbonated or non-carbonated.

Pushing a cup-sensing lever of a pour station engages the switch in that pour station dispensing module. In response to a signal from the engaged switch, and based on its stored data, the controller activates a concentrate pump and opens the water or carbonated water valve of the module corresponding to the engaged switch. For example, assume that beverage A is a carbonated beverage, that beverage A concentrate should be pumped at a first speed to achieve the proper concentrate/diluent ratio, that beverage C is a non-carbonated beverage and that beverage C concentrate should be pumped at a second speed (different from the first speed) to achieve the proper concentrate/diluent ratio. Pushing against cup-sensing lever 10 engages the switch within the station 2 dispensing module. This causes the controller to activate the station 2 concentrate pump at the first speed and open the station 2 dispensing module carbonated water valve. This results in a flow of beverage A concentrate and carbonated water through the station 2 dispensing module and out of nozzle 6. Pushing against cup-sensing lever 12 engages the switch within the station 4 dispensing module. This causes the controller to activate the station 4 concentrate pump at the second speed and open the non-carbonated water valve of the station 4 dispensing module. This results in a flow of beverage C concentrate and non-carbonated water through the station 4 dispensing module and out of nozzle 8.

Various components of dispenser 1 are contained within a main housing 14. The front face of dispenser 1 includes a lighted merchandizing panel 15. Panel 15 includes a main display area 20 that can be used for logos or other advertising material for a beverage, a business in which dispenser 1 is located, etc. Panel 15 also includes four smaller display regions 21, 22, 23 and 24 that respectively correspond to pour stations 2, 3, 4 and 5. Each of the smaller display regions 21-24 may have a lighted area with a logo or other product information relating to a beverage dispensed at the corresponding pour station. Each of the smaller display regions 21-24 may also include one or more buttons that a user can press to initiate various operations. For example, a pour station display region may have a button that a customer could push instead of the cup-sensing lever to begin beverage flow. As another example, a pour station display region might include a button that can be pressed to only dispense carbonated water or non-carbonated water.

Dispenser 1 further includes a backsplash 25 and a drain pan assembly 26. Spillage and drips from nozzles 6-9 fall through the spaces of a grill (not shown) in drain pan assembly 26 and are funneled into a drain tube (also not shown) for disposal. Although dispenser 1 includes four pour stations, this is merely for purpose of example. Other embodiments include dispensers having more or fewer pour stations. In some embodiments a dispenser may also include an ice dispensing mechanism.

Figure 2:
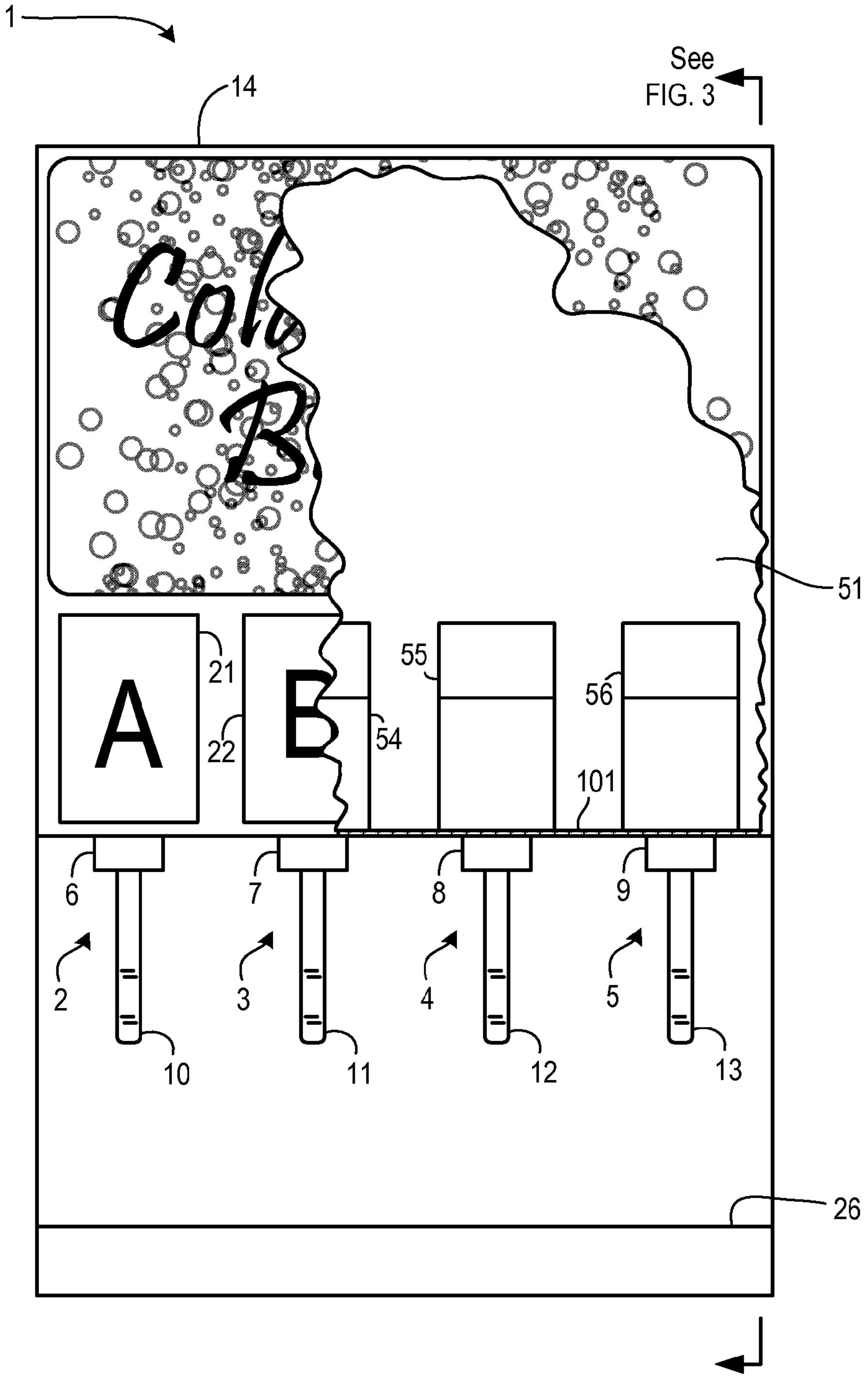
FIG. 2 is a front elevational view of the beverage dispenser of FIG. 1, but with a portion of the front face removed to show internal components.

FIG. 2 is another front elevational view of beverage dispenser 1, but with a portion of merchandizing panel 15 removed to show internal components. In particular, dispensing modules 54, 55 and 56 respectively correspond to pour stations 3, 4 and 5. The dispensing module corresponding to pour station 2 is similar and located in a similar arrangement relative to nozzle 6 and lever 10 of station 2. A bulkhead 51 separates front and rear compartments of the dispenser 1 interior.

Figure 3:
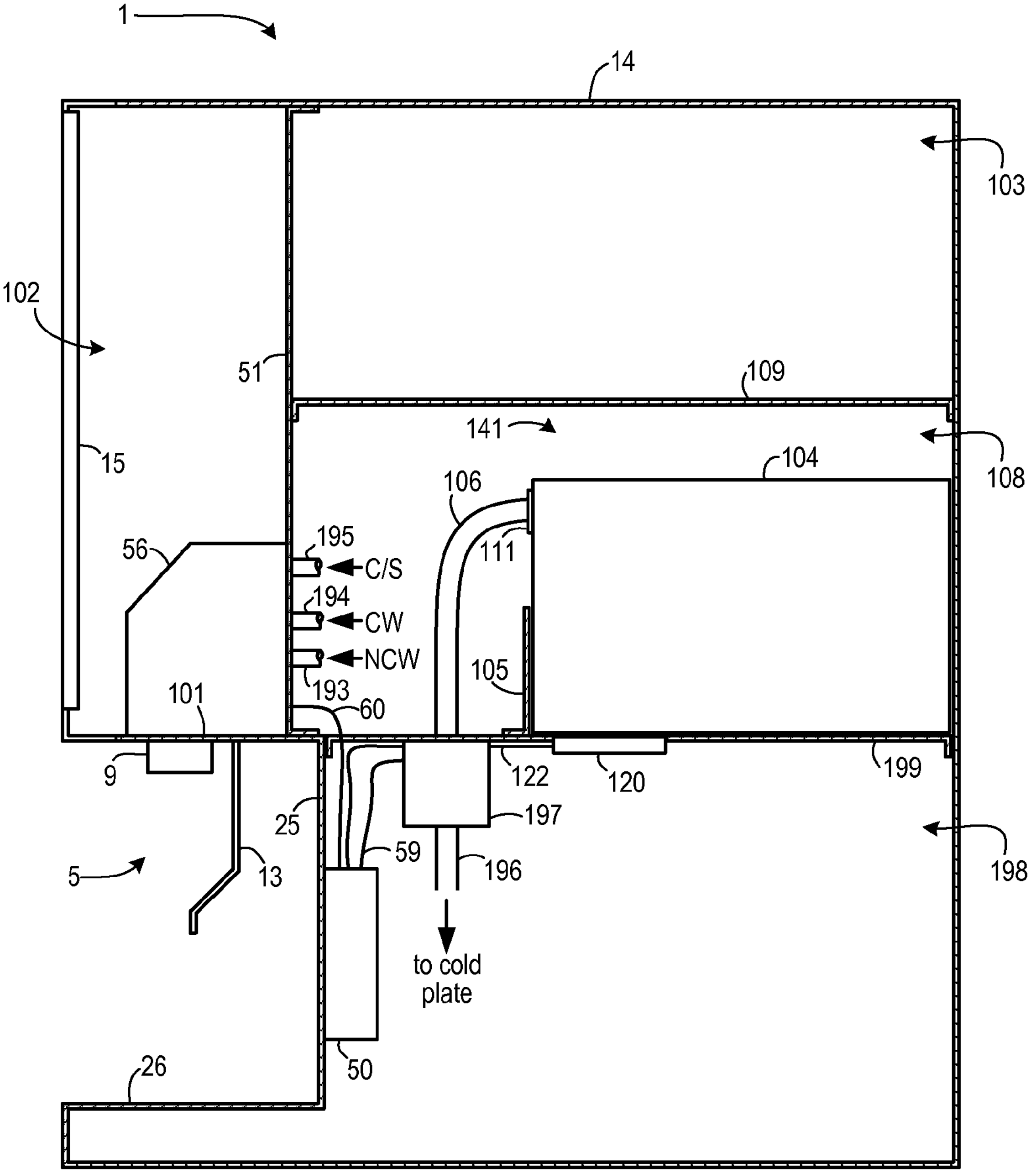
FIG. 3 is a cross-sectional view of the beverage dispenser from FIGS. 1 and 2 taken from the location indicated in FIG. 2.

FIG. 3 is a cross-sectional view of dispenser 1 taken from the location shown in FIG. 2. Dispensing module 56 corresponding to pour station 5 is located above nozzle 9. Module 56 and other dispensing modules (not visible in FIG. 3) are mounted on a shelf 101 in a front compartment 102 of housing 14. Merchandizing panel 15 is also located in front compartment 102. In at least some embodiments, merchandizing panel 15 utilizes LED (light emitting diode) lighting elements to reduce the space needed for the display elements. This facilitates location of the dispenser modules and other components closer to the front of dispenser 1. In turn, this allows more room in the rear of dispenser 1 for fluid containers and other elements described below.

An upper rear compartment 103 is separated from a lower rear compartment 108 by a shelf 109. In some embodiments, compartment 103 houses an ice dispenser. In other embodiments, compartment 103 is not used. Middle rear compartment 108 includes a shelf 199 having a bracket 105 attached thereto. Bracket 105 holds a replaceable fluid container 104 in an installation position 141 that corresponds to module 56. Container 104 is a "bag in box" (BIB) type of container that holds beverage concentrate for beverage D. As explained in more detail below, container 104 can be replaced with a container holding concentrate for a different beverage or with a container that holds a sanitizer. As used herein, "sanitizer" or "sanitizing liquid" refers to any liquid that can be used to clean and/or disinfect internal fluid passageways of dispenser 1, but that is not intended for human consumption (except as a result of trace quantities that may remain in fluid passageways after cleaning and/or disinfection).

Located under shelf 199 is a lower rear compartment 198. A controller 50 is located in lower rear compartment 198 and can be attached to a rear face of backsplash 25. As explained more fully below, controller 50 includes processing circuitry and memory and is configured to control operations of dispenser 1. Controller 50 communicates instructions to and receives signals from dispensing module 56 via a wiring harness 60. Although represented as a single line for convenience, harness 60 could include multiple wires to carry instruction signals and/or energizing power to the valves of module 56 and to receive signals from the module 56 dispensing switch. In a similar manner, controller 50 communicates with and/or supplies power to the station 2 module, to module 54 and to module 55 using additional harnesses (not shown). As with harness 60, each of those harnesses could include multiple power and/or signal wires.

Controller 50 also communicates control signals and/or provides power to a pump unit 197 over a second wiring harness 59. As with harness 60, harness 59 could include multiple wires to carry instruction signals and/or energizing power. Pump unit 197 includes an electric motor and a pump. In response to control signals and/or power from controller 50, the motor drives the pump unit so as to pump concentrate (or other fluid) from a container in installation position 141.

In particular, the concentrate pump of pump module 197 is in fluid communication with the interior lumen of a feed tube 106. As used herein, "in fluid communication" means that fluid can flow from one named point to another named point. Once container 104 (or another container) is placed into installation position 141 and tube 106 is inserted into the container, pump unit 197 can thereby withdraw fluid from that installed container. A first end of tube 106 is inserted into container 104 through an access port 111. A second end of tube 106 is attached to a fitting (not shown) of pump unit 197 that protrudes through shelf 199. Fluid output from pump unit 197 flows through a line 196 and under a cold plate (not shown in FIG. 3). Line 196 then continues through another cutout (not shown) in shelf 199 and is connected to a concentrate inlet 195 of module 56. When actuated by controller 50, pump unit 197 causes fluid (concentrate or sanitizer, C/S) from the container in position 141 to flow into module 56 and out of nozzle 9.

Module 56 further includes fittings 194 and 193 that pass through bulkhead 51 and attach to diluent input lines not shown in FIG. 3. A diluent input line attaches to fitting 194 and supplies chilled carbonated water (CW) to a first valve of module 56. The carbonated water diluent line also passes through a cutout (not shown) in shelf 199 and under the above mentioned cold plate. Another diluent input line attaches to fitting 193 and supplies chilled non-carbonated water (NCW) to a second valve of module 56. The diluent line supplying chilled non-carbonated water also passes through a cutout in floor 199 and under the above-mentioned cold plate. In this manner, module 56 can be supplied with chilled diluent and chilled beverage concentrate.

So as to avoid unnecessary drawing detail, certain conventional components have been omitted from FIG. 3. For example, connections to an external power supply (e.g., to a source of 120V AC power) and components for distributing electrical power to controller 50 and other components of dispenser 1 (e.g., AC/DC converter and power supply, distribution wiring, etc.) are not shown. As another example, the internal details of drain pan assembly 26 and the connection of drain pan 26 to a fluid disposal outlet are not shown. Also omitted from FIG. 3 are details of the elements used to supply carbonated and non-carbonated water. In some embodiments, an external water source is attached to a fitting on the rear or underside of housing 14. A portion of the water from that external source is diverted to a carbonator within housing 14 (also not shown) so as to generate carbonated water. Carbonated water and non-carbonated water then pass under the cold plate. In other embodiments, a water bath or other chilling device is employed. In certain embodiments, a carbonator is not contained in housing 14, and carbonated water is delivered to dispenser 1 from an external source.

Returning to FIG. 3, a data reader 120 is mounted in an opening of shelf 109 in a position under an indicia region of container 104. As explained in further detail below, container 104 and each of the other containers installable in position 141 includes a region on which is provided certain machine-readable indicia. This indicia on each container provides information corresponding to the container's contents. Data reader 120 scans the indicia region of the container and provides resulting scan data to controller 50 through one or more signal lines within a wiring harness 122. In at least some embodiments, data reader 120 is a magnetic ink reader. Numerous commercially-available types of magnetic ink readers and associated control electronics are known in the art and thus not further described herein. Other embodiments may employ different types of known and commercially available data reading devices, including but not limited to RFID (radio frequency ID) readers, bar code scanners, OCR (optical character recognition) scanners, etc.

In the embodiment of FIGS. 1-8, each pour station has corresponding components within housing 14 that are similar to those described in connection with pour station 5 in FIG. 3. For example, and as previously discussed in connection with FIG. 2, each pour station has its own dispenser module. Separate replaceable fluid containers can be placed into installation positions that are behind each of the other dispensing modules in the same manner that position 141 is behind module 56. Each of the other modules is supplied with fluid from its corresponding fluid container by a pump unit similar to pump unit 197, with each pump unit fed by a corresponding supply tube (similar to tube 106) in fluid communication with the interior of the fluid container in the corresponding installation position. Each of the other modules also includes fittings, similar to fittings 193-195, that protrude through bulkhead 51 for connection to lines supplying chilled carbonated water, chilled non-carbonated water, and chilled fluid pumped from the container in the corresponding installation position. As with fluid lines connected to fittings 193-195 of module 56, the fluid lines connected to the fittings of the other modules also pass under the above-mentioned cold plate. Each module includes valves similar to those of module 56. Controller 50 communicates with (and/or powers) the valves of the other modules over harnesses similar to harness 60. Controller 50 also communicates with and/or powers the other pumping units using harnesses similar to harness 59. Separate data readers similar to data reader 120 are located in openings of shelf 199 that correspond to the other installation positions, and that are configured (like reader 120) to scan identifying indicia on installed fluid containers. These other data readers are connected to controller 50 by wiring harnesses similar to harness 122 and provide data to controller 50 based on scanned indicia.

In some embodiments, individual diluent lines may not be connected to each module. In some such embodiments, the non-carbonated water valve of each module is connected to a first manifold, with that first manifold connected to a single line supplying chilled non-carbonated water from under a cold plate. Similarly, the carbonated water valve of each module in some such embodiments is connected to a second manifold, with that second manifold connected to another line supplying chilled carbonated water from under a cold plate.

Figure 4A:
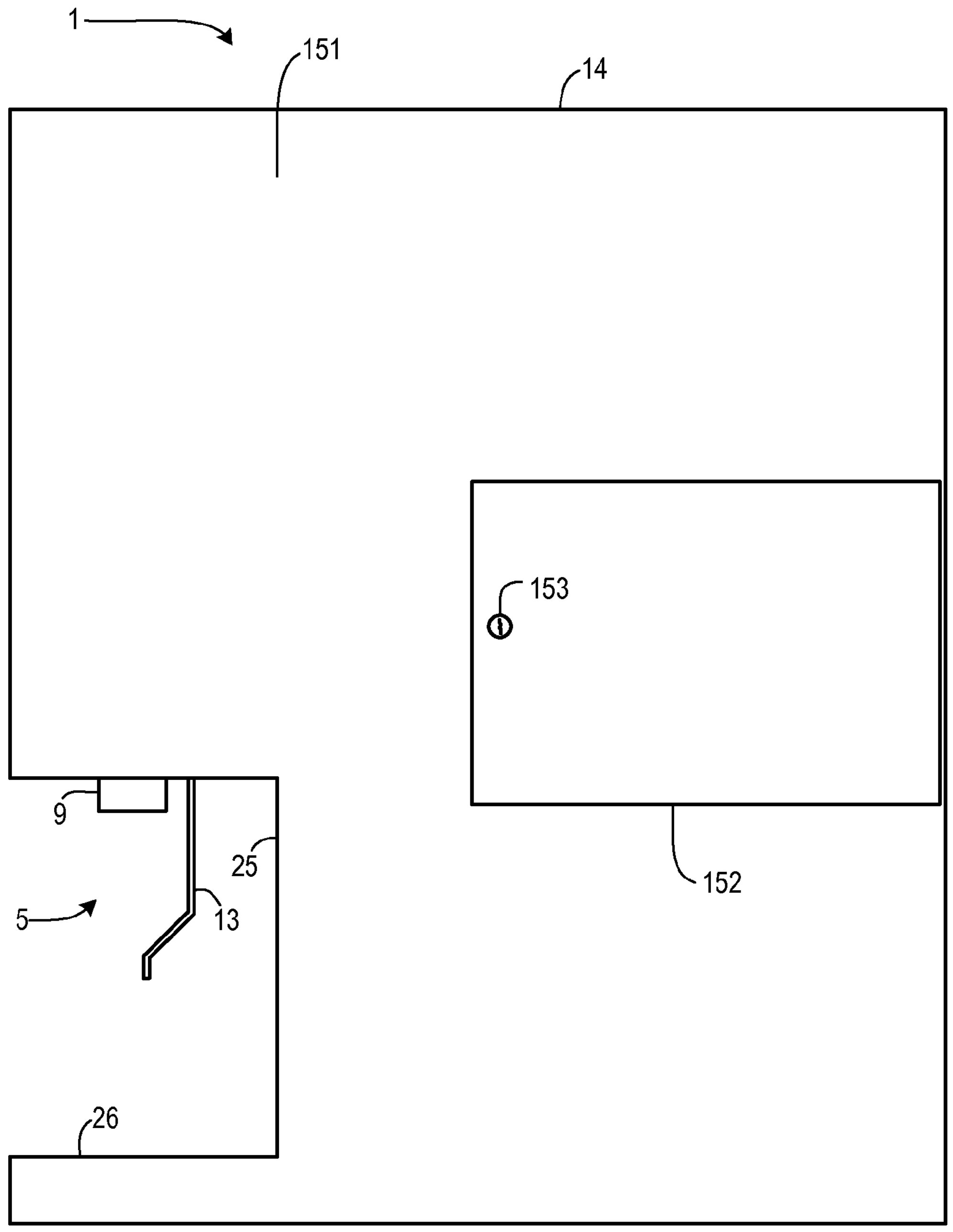
FIGS. 4A and 4B are side views of the dispenser from FIGS. 1 and 2 taken from the location shown in FIG. 1.
Figure 4B:
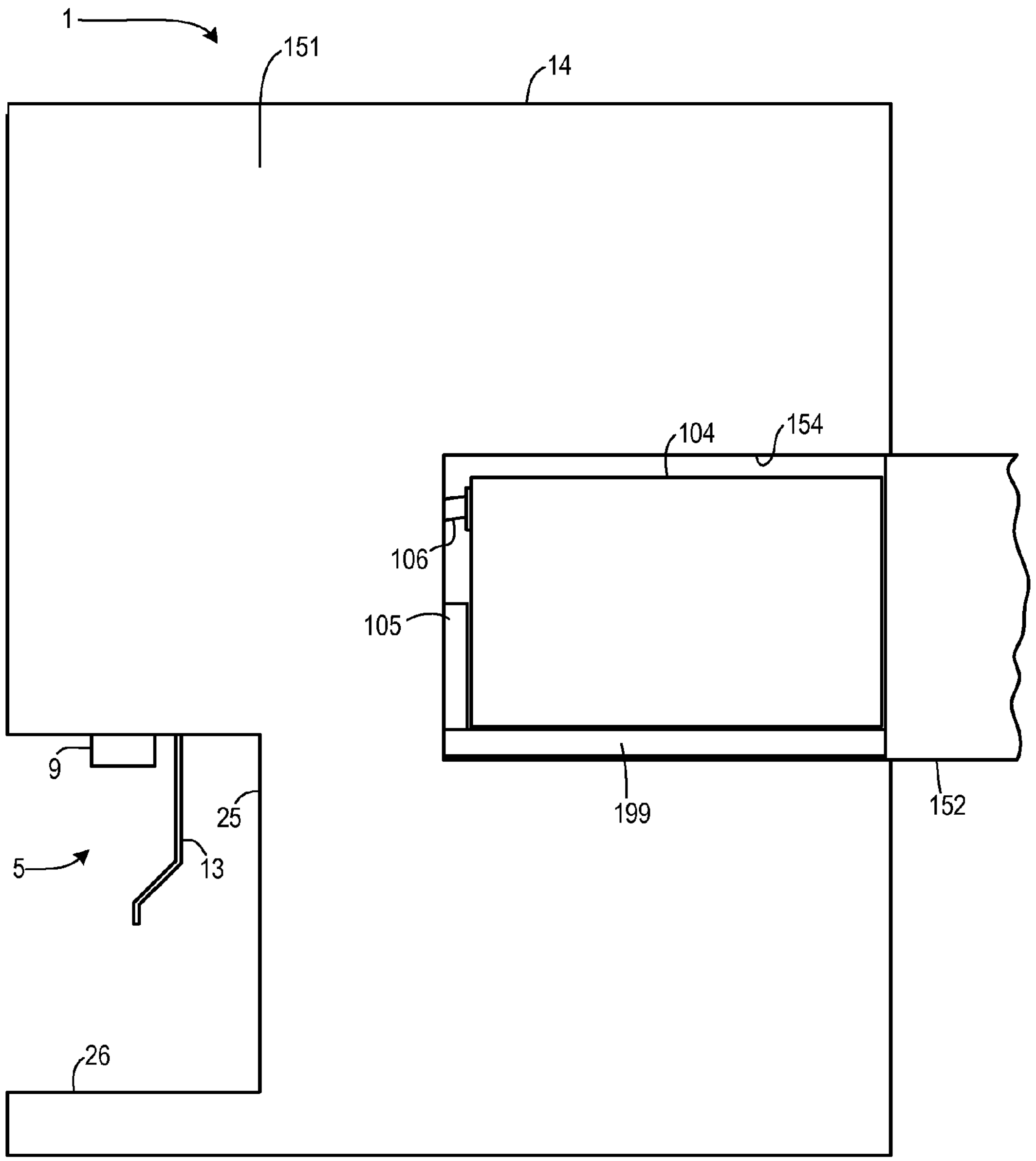

FIG. 4A is a side view of dispenser 1 from the location shown in FIG. 1. The external face 151 of housing 14 includes a hinged door 152 that provides access to upper rear compartment 103. Door 152 may be secured with a keyed lock 153 to prevent unauthorized access in the inside of dispenser 1. FIG. 4B shows the same side view of dispenser 1, but with door 152 in an open position. A portion of door 152 is removed in FIG. 4B for convenience. Upon opening door 152, container 104 can be removed through the resulting opening 154 in the side of housing 14. In some embodiments, tube 106 has sufficient extra length to permit the end of tube 106 to follow container 104 during removal from housing 14. In this manner, and after removing container 104 from installation position 141, the end of tube 106 can be removed from container 104 and placed into the access port of a replacement fluid container. The replacement fluid container (with inserted tube 106 end) can then be placed into installation position 141.

In some embodiments, other fluid containers in compartment 108 are similarly replaced through opening 154. In some such embodiments, it may be necessary to remove container 104 (and perhaps other containers) in order to reach containers located on the opposite side of container 104. In other embodiments, the opposite side of dispenser housing 14 has a similar hinged door providing access to compartment 108. This would permit access to the fluid container corresponding to pour station 2 directly, and access to the pour station 3 fluid container after removal of the pour station 2 container. In still other embodiments, additional access doors may be included in the top and/or rear of housing 14 to provide direct access to the fluid containers associated with pour stations 3 and 4.

In still other embodiments, only some of the pour stations are supplied with beverage concentrate from containers located within the beverage dispenser housing. In some embodiments, for example, both sides of housing 14 have an access door similar to door 152, but only the pour stations on the sides of the dispenser (stations 2 and 5 in the embodiment of FIGS. 1-8) receive concentrate from containers stored in the housing. The dispensing modules corresponding to other pour stations are then connected to fluid lines that supply concentrate from a BIB or other container located external to the dispenser.

Figure 5A:
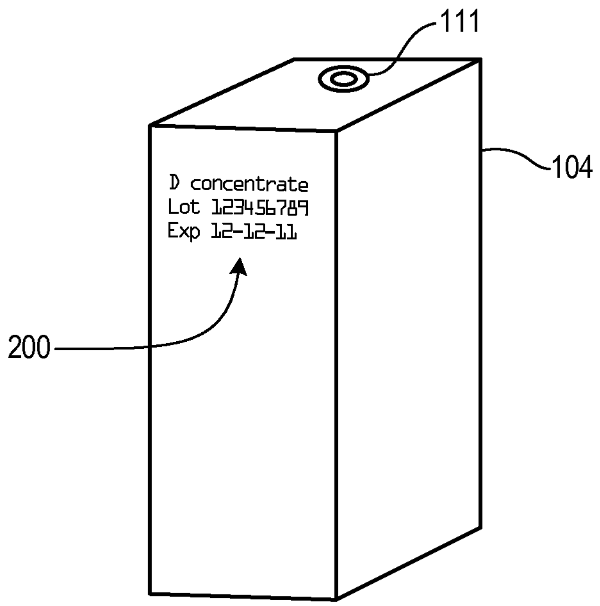
FIGS. 5A and 5B show replaceable fluid containers for holding beverage concentrate and sanitizing liquid, respectively, according to at least some embodiments.

FIG. 5A is a bottom perspective view of fluid container 104. As previously indicated in connection with FIG. 3, container 104 includes an access port 111 through which a tube can be inserted to withdraw fluid stored in container 104. Container 104 can be formed from liquid impermeable cardboard or other material conventionally used for liquid containers, or may include a separate plastic bladder or other type of fluid holding structure. Indicia region 200 is located on the bottom surface of container 104 in a position that rests over data scanner 120 when container 104 is properly placed into installation position 141. Region 200 includes information corresponding to the contents of container 104, which information is printed with magnetic ink. In this manner, information in region 200 is both human- and machine-readable. In the present example, the information in region 200 includes a description of the liquid in the container 104 ("D concentrate"), the lot number for the container, as well as an expiration date. Other types of information corresponding to the container 104 contents could also or alternatively be included in region 200. In at least some embodiments, indicia in the indicia region includes human language characters (i.e., numerals and/or characters of a human language alphabet).

Figure 5B:
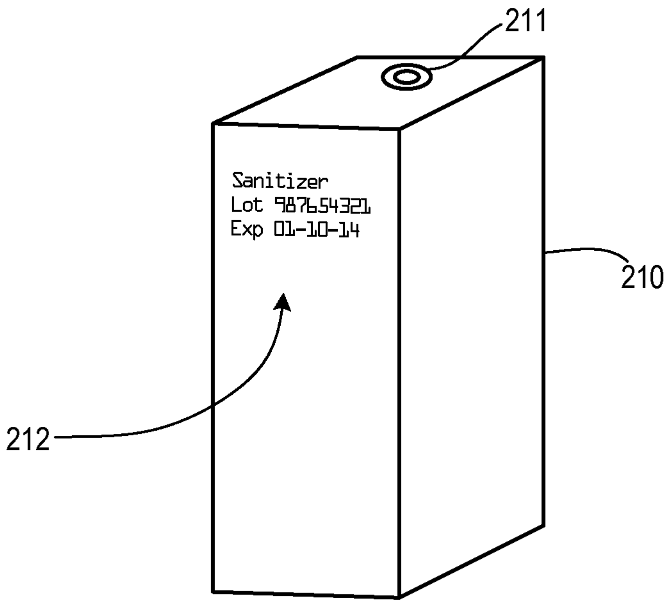

As indicated above, after container 104 is installed in position 141, container 104 can be removed and replaced with a different container of similar construction, but which stores a different liquid. For example, a replacement container could store concentrate for a different beverage. In such a case, the indicia region of the replacement container could include human- and machine-readable indicia that identifies or otherwise corresponds to the contents (and that may also contain other information). In other cases, a replacement container could hold a liquid used to clean and/or disinfect components of dispenser 1. For example, FIG. 5B is a bottom perspective view of a fluid container 210 that stores a sanitizer liquid. Use of such a liquid is further described in connection with FIG. 7.

Although FIGS. 5A and 5B show fluid containers as being of the same general size, this need not be the case. In some embodiments, for example, one or more brackets or other components are adjustable so as to accommodate fluid containers of differing sizes and/or shapes. For example, bracket 105 (FIG. 3) could be slidable between front and rear positions so as to securely hold smaller containers. Indicia regions could be on other locations, with the locations of data readers within a dispenser also modified so as to scan indicia in those other locations. In some embodiments, a data reader might be movable. This could be useful, e.g., if different manufacturers of containers place indicia regions on different parts of their containers.

Figure 6:
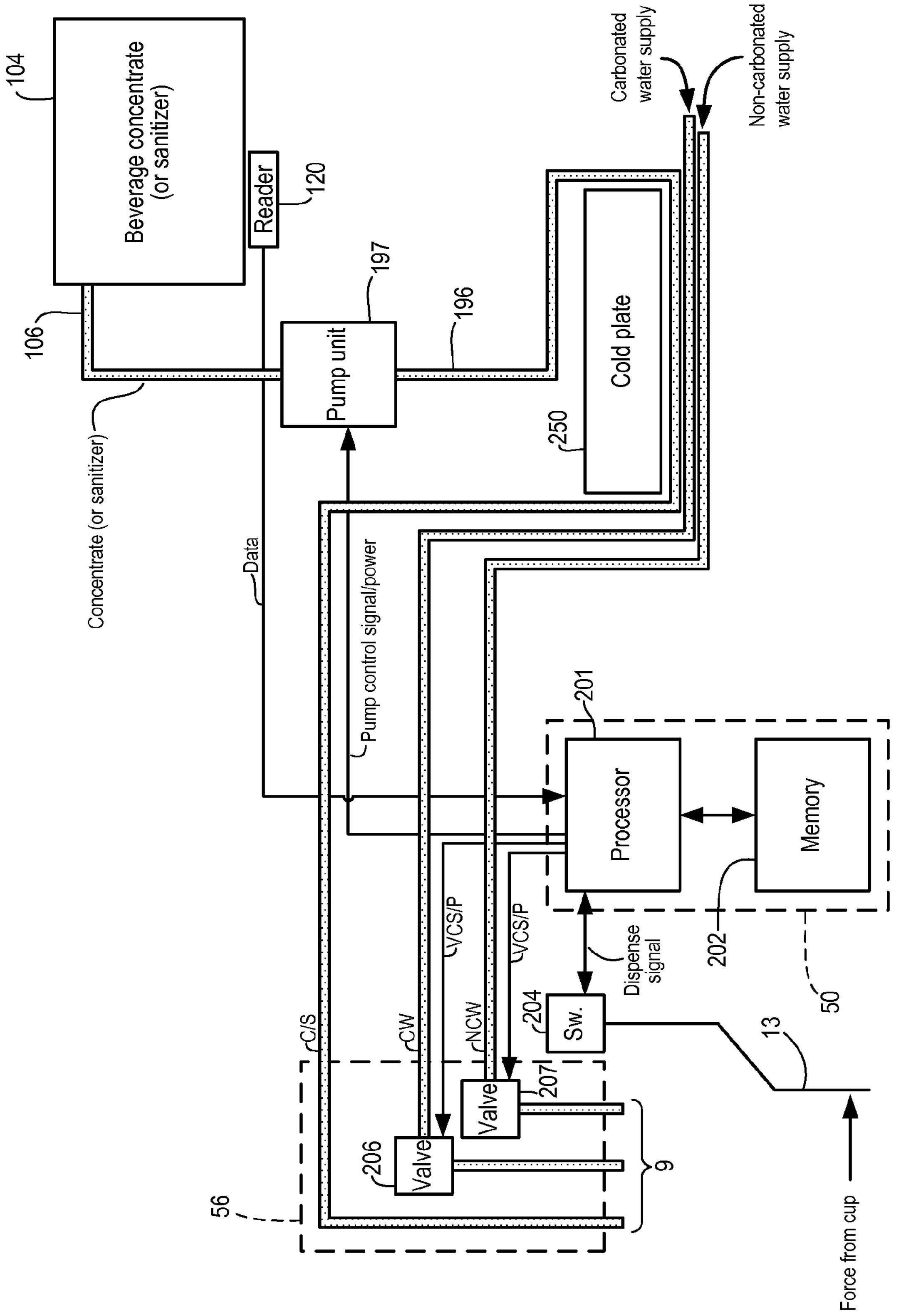
FIG. 6 is a block diagram showing the interaction of various components according to at least some embodiments.

FIG. 6 is a block diagram showing the interaction of controller 50 and various components corresponding to pour station 5 according to at least some embodiments, and showing fluid and signal flows in connection with module 56 of pour station 5. Although not shown in FIG. 6, controller 50 communicates with similar components corresponding to each of pour stations 2, 3 and 4 and controls those components in a manner similar to that described in connection with pour station 5.

Controller 50 includes processing circuitry 201 that executes instructions to carry out operations of controller 50 described herein. Those instructions can be stored as executable instructions and data in a memory 202 and/or may be hardwired logic within processing circuitry 201. Memory 202 also stores data as further described below. Although shown as separate blocks in FIG. 6, processing circuitry 201 and memory 202 could be implemented as part of a single integrated circuit device. Feed tube 106 supplies liquid from a fluid container to pump unit 197 corresponding to module 56. Pump unit 197 can include a variable speed peristaltic pump or other type of known pump used for pumping beverage grade liquid at a controllable rate, with pump speed versus flow rate data provided by the pump manufacturer or determined through a calibration test. In the example of FIG. 6, the installed fluid container is beverage D concentrate container 104. However, a fluid container containing another liquid (e.g., a concentrate of another beverage, a sanitizer) could be installed.

As previously explained, fluid output through line 196 of pump unit 197 passes under a cold plate. That cold plate is represented in FIG. 6 as block 250. Similarly, water and non-carbonated water lines pass under cold plate 250 so as to chill the carbonated water and non-carbonated water supplied to module 56. As also shown in FIG. 6, module 56 further includes diluent valves 206 and 207. Valve 206 receives chilled carbonated water (CW) and can be electrically opened to admit chilled carbonated water from nozzle 9. Valve 207 receives chilled non-carbonated water (NCW) can be electrically opened to admit chilled non-carbonated water from nozzle 9. Valves 206 and 207 can be, e.g., conventional solenoid-operated valves that can be selectively opened and closed by transmission of an electrical signal. A diluent from one of valves 206 or 207 and liquid from pump unit 197 flows out of nozzle 9 and is mixed in a cup or other receptacle placed under nozzle 9.

As explained in connection with FIG. 3, data reader 120 scans an indicia region of a fluid container installed in position 141 corresponding to dispensing module 56. After scanning that region of the installed container, reader 120 communicates data corresponding to the scanned indicia to processing circuitry 201. Circuitry 201 then stores data in memory 202 indicating action to take if switch 204 is closed. If the received scan data corresponds to sanitizer, circuitry 201 stores data in memory 202 indicating that closure of switch 204 should cause pump 203 to activate (either at a predefined rate or at a rate previously set for an earlier container) and valve 207 to open. If the received scan data corresponds to a beverage concentrate, circuitry 201 consults a lookup table (or other data) in memory 202 and determines the proper mixing parameters for the identified beverage concentrate. In particular, circuitry 201 determines whether the corresponding diluent for the identified beverage concentrate is delivered through valve 206 or valve 207. Circuitry 201 also determines the appropriate rate at which pump 203 must be operated so as to mix the concentrate and the corresponding diluent in the correct ratio. The determined mixing parameters can then be stored in memory 202.

Cup-sensing lever 13 is coupled to switch 204 of module 56. As lever 13 is pushed, switch 204 closes and causes processing circuitry 201 to receive a dispense signal. In response to the dispense signal, processing circuitry 201 consults the data previously stored in memory 203 and activates components of module 56 in accordance with that data. If the previously stored data were the result of scan data from a sanitizer container, circuitry 201 would activate pump unit 197 and open valve 207. If the previously-stored data were the result of scan data from a beverage concentrate container, circuitry 201 would cause pump unit 197 to operate at the determined appropriate rate and would open the one of valves 206 or 207 corresponding to the correct diluent.

In some embodiments, switch 204 is not actuated by a cup sensing lever such as cup sensing lever 13. Instead, cup-sensing levers are omitted from pour stations and buttons on the front face of a merchandiser are used to activate dispensing module switches similar to switch 13.

Figure 7:
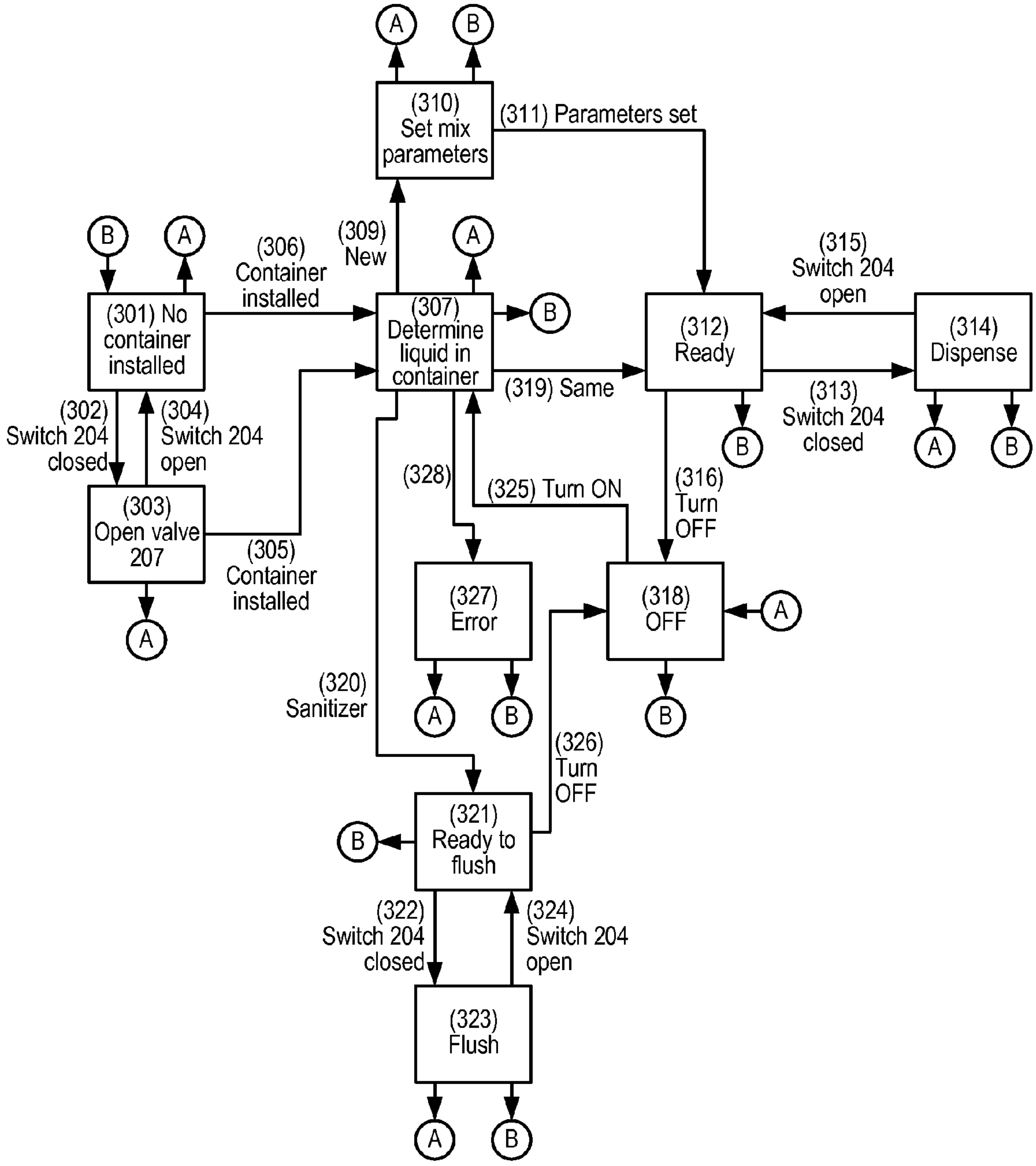
FIG. 7 is a state diagram of a control routine for a beverage dispenser according to at least some embodiments.

FIG. 7 is a state diagram showing a control routine performed by controller 50 according to at least some embodiments. Each of the states shown in FIG. 7 is a state of controller 50 and represents operations performed by controller 50 relative to components pour station 5 (e.g., dispensing module 56 and data reader 120). In at least some embodiments, controller 50 simultaneously performs separate instances of the control routine of FIG. 7 for each of the pour stations in dispenser 1.

Based on the scan data received from data reader 120, controller 50 can determine whether a fluid container is installed in position 141. If no fluid container is installed in position 141 and the power to dispenser 1 is ON, controller 50 is in the state of block 301. If switch 204 (FIG. 6) is closed while in controller 50 is in the block 301 state, the control routine proceeds on branch 302 to block 303. In the state of block 303, controller 50 opens non-carbonated water valve 207 but does not activate pump unit 197. If switch 204 is opened, the routine returns on branch 304 to block 301. If dispenser 1 is turned OFF while controller 50 is in the block 303 state, the control routine proceeds to block 318 (discussed below) on the A connector. If a container is placed in location 141 while controller 50 is in the block 303 state, the control routine proceeds to block 307 on path 305.

In the state of block 307, which could also be reached on path 306 after placement of a container in location 141 when controller 50 is in the block 301 state, valves 206 and 207 are closed, pump unit 197 is inactive, and controller 50 analyzes data from reader 120 to determine the contents of the installed fluid container. If controller 50 determines that the installed container stores a beverage concentrate, controller 50 then determines if that concentrate is different from the concentrate in a previously-installed container. For example, a previously-installed fluid container may have been exhausted, but a business proprietor might not wish to change the beverage that is dispensed at pour station 5. In such a case, the proprietor may simply replace an empty container with a full container of the same beverage concentrate. In this circumstance, there may be no need to reset mixing parameters, and the control algorithm could proceed directly to block 312 (discussed below) on path 319.

If controller 50 determines that the installed container contains a beverage concentrate that is different from the concentrate in a previously-installed container, the control routine proceeds to block 310 on branch 309. In the state of block 310, controller 50 sets the mixing parameters for pour station 5 based on the determined concentrate. In particular, controller 50 stores data that indicates whether valve 206 or valve 207 should be opened to obtain the proper diluent corresponding to the determined concentrate, as well as data indicating the rate at which pump unit 197 must be operated so as to mix the concentrate and diluent at the correct ratio. After controller 50 sets the mixing parameters, the control routine proceeds on branch 311 to block 312.

In the state of block 312, controller 50 is ready to dispense a beverage. If switch 204 is closed while controller 50 is in the block 312 state, the control routine proceeds to on path 313 to block 314. In the block 314 state, pump unit 197 is activated, and one of diluent valves 206 or 207 is opened, in accordance with the mix parameters set in block 310. If switch 204 is closed while controller is in the block 314 state, pump unit 197 is deactivated and the opened diluent valve closed, and the control routine returns to block 312 on path 315. If power to dispenser 1 or controller 50 is interrupted while controller 50 is in the block 312 state, the control routine proceeds to block 318 on path 316. The OFF state of block 318 is described below.

Returning to block 307, if controller 50 is unable to determine the fluid held by the container just installed (e.g., if indicia is absent or unreadable), the control routine proceeds to block 327 on path 328. In the "error" state of block 327, controller 50 awaits takes no action and awaits a power-OFF reset or installation of a different container. If the power is turned OFF, the control routine proceeds to block 318 on the A connector. If the operator chooses to replace the container that resulted in the error state while power remains on, the control routine proceeds to block 301 on the B connector when the presently-installed container is removed. In some embodiments, controller 50 may cause a light to flash or otherwise provide an indicator to an operator of the error condition.

If in the block 307 state controller 50 determines that the installed container holds sanitizer, the control routine proceeds to block 321 on path 320. While in the block 321 state, the memory of controller 50 holds data indicating that a signal from switch 204 corresponds to activation of pump unit 197 and opening of valve 207, and controller 50 awaits further input. Pump unit 197 is deactivated and valves 206 and 207 are closed. If switch 204 is closed while controller 50 is in the block 321 state, the control routine proceeds on path 322 to block 323. In the block 323 state, controller 50 activates pump unit 197 at the maximum (or other predetermined) flow rate and opens valve 207. When switch 204 is opened while in the block 323 state, the control routine returns to block 321 on path 324.

If dispenser 1 is turned OFF while controller 50 is in the block 321 state, the control routine proceeds to block 318 on path 326 and enters an OFF state. In the OFF state, pump unit 197 remains off, valves 206 and 207 remain closed, and closing switch 204 or replacing a fluid container has no effect. If dispenser 1 is turned ON while in the OFF state and while a fluid container is installed in position 141, the control routine returns to block 307 on path 325. In this manner, turning dispenser 1 OFF then ON acts to reset the control routine. If dispenser 1 is turned ON while in the OFF state and while a fluid container is not installed in position 141, the control routine returns to block 301 on the B connector.

If dispenser 1 is turned OFF when the control algorithm is in any of the block 301, 307, 310, 314, 323, 327 or 303 states, and as also shown in FIG. 7, the OFF state of block 318 can be reached by an A connector. Similarly, removal of a fluid container from position 141 while the control algorithm is in any of the block 307, 310, 312, 314, 321, 323 or 327 states causes the control routine to proceed to the block 301 state on a B connector.

As indicated above, controller 50 may simultaneously execute instructions in separate programming threads so as to carry out the control routine of FIG. 7 for each of pour stations 2 through 5. However, the each of those routines is performed independently of the other routines, and controller 50 might be in a different state relative to each pour station at any given time.

As can be appreciated from the foregoing, various embodiments permit rapid reconfiguration of dispenser 1 so as to change the beverage dispensed from a particular pour station. Specifically, a proprietor can simply open the housing 14 and replace a beverage container with a sanitizer container. After flushing the dispensing module with sanitizer for an appropriate amount of time (e.g., for 30 seconds or until the output from the nozzle is clear), the sanitizer container can be replaced with a fluid container holding concentrate for the new beverage.

Figure 8:
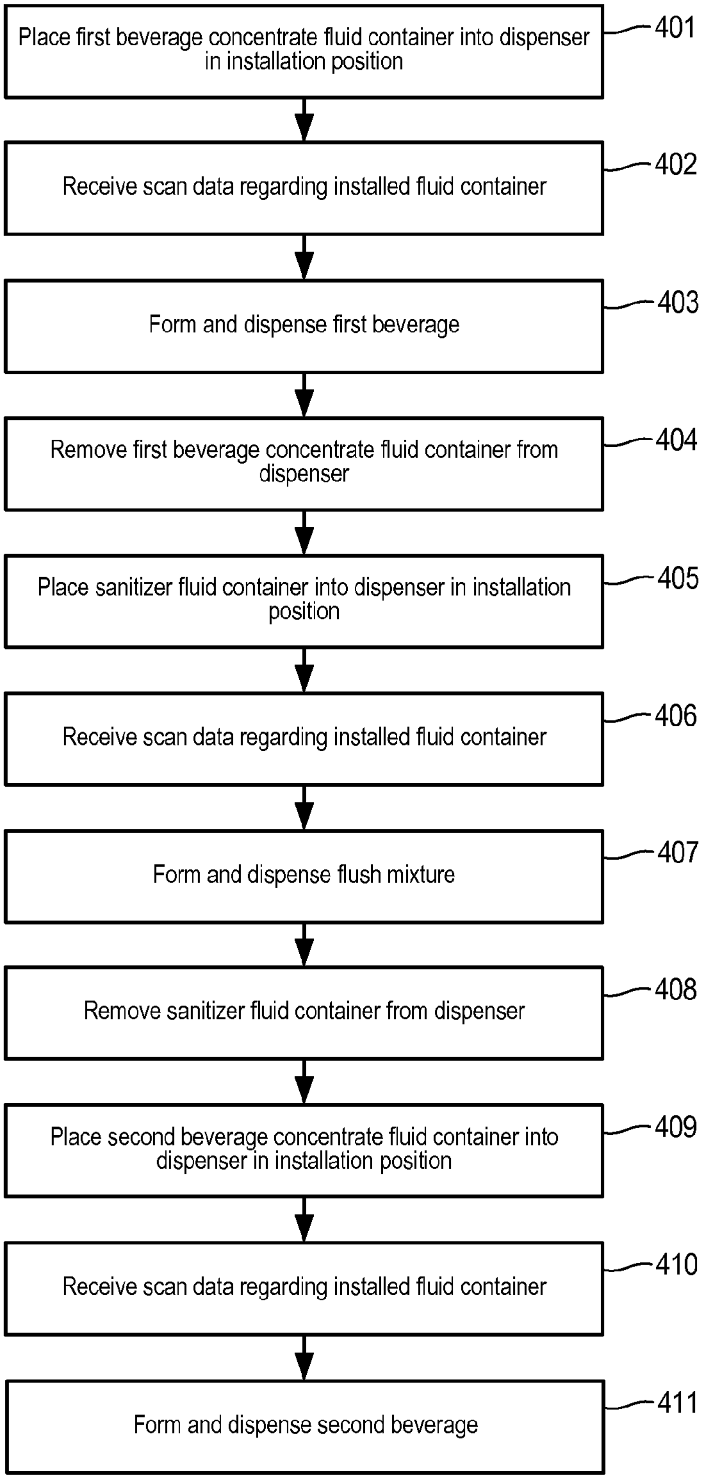
FIG. 8 is a flow chart showing steps of a method for reconfiguring a post-mix beverage dispenser according to some embodiments.

FIG. 8 is a flow chart showing steps of a method for reconfiguring dispenser 1 according to some embodiments. At block 401, an operator places fluid container 104 in installation position 141 corresponding to module 56. For purposes of the present example, it is assumed that beverage D is a carbonated beverage, and that the diluent corresponding to beverage D (and thus, to beverage D concentrate) is carbonated water. Next, and as shown by block 402, data reader 120 scans the indicia region 200 of container 104, and data from that scan is received by controller 50. In response to a subsequent closing of switch 204, and as shown by block 403, controller 50 then forms beverage D by activating pump unit 197 and opening valve 206. Controller 50 operates pump unit 197 so as to mix the beverage D concentrate with carbonated water at a proper ratio, and selects valve 206 as the corresponding diluent valve, using mixing parameters based on the data received at block 402.

At a time subsequent to block 403, a decision is made to reconfigure dispenser 1 so that non-carbonated beverage E is dispensed from module 56. At block 404, container 104 is removed from dispenser 1. A block 405, sanitizer container 210 (FIG. 5B) is placed into installation position 141 vacated by container 104. At block 406, data reader 120 scans the identification indicia region 212 of container 210, and data from that scan is received by controller 50. At block 407, and in response to another operator input (e.g., pushing on lever 13), controller 50 forms a flush mixture by activating pump unit 197 and opening valve 207. Controller 50 selects valve 207 as the corresponding diluent valve based on the data received at block 406. In some embodiments, after determining that sanitizer is to be pumped, controller 50 simply operates pump unit 197 at whatever the last pump setting may have been (in the present case, the pump setting for beverage D). In other embodiments, controller 50 may be configured to operate pump unit 197 at a specific setting (e.g., a pump speed corresponding to maximum flow) based on scan data indicative of sanitizer.

After the operator determines that module 56 and pump unit 197 have been suitably cleaned, sanitizer container 210 is removed from dispenser 1 (block 408). The operator then places a third container into position 141 vacated by container 210 (block 409). The third container holds beverage E concentrate. Although not shown in the drawings, the third container is of a size and shape similar to containers 104 and 210 and includes an indicia region in a location similar to location 200 on container 104 and location 212 on container 210. The indicia region of the third container contains indicia (e.g., "E concentrate" imprinted in magnetic ink) corresponding to the third container contents.

At block 410, data reader 120 scans the indicia region of the third container, and data from that scan is received by controller 50. In response to a subsequent closing of switch 204, and as shown by block 411, controller 50 then forms beverage E by activating pump unit 197 and opening valve 207. Controller 50 operates pump unit 197 so as to mix the beverage E concentrate with non-carbonated water at the correct ratio, and selects valve 207 as the corresponding diluent valve, based on the data received at block 410. The ratio of beverage E concentrate to non-carbonated water in block 411 may be different from the ratio of beverage D concentrate to carbonated water in block 403.

In the embodiments described thus far, a controllable pump is used as a meterable flow control device so as to form a beverage with the correct ratio of concentrate and diluent. As used herein, a "meterable flow control device" is a device that can control the rate at which a flow occurs. In other embodiments, other types of meterable flow control devices may be used to obtain a flow of concentrate (and/or diluent) at a desired rate so as to achieve a desired mixing ratio. For example, concentrate could be pumped from a container using a constant flow or constant pressure pump. The flow of concentrate could then be metered using a valve that can be partially opened in stages so as to allow different flows. In some such embodiments, a controller may control flow of concentrate and diluent using techniques similar to those described U.S. Pat. No. 7,156,259, and flow sensors can be added to concentrate and diluent lines to provide feedback to the controller.

In still other embodiments, a controller may not be configured to automatically select one of multiple diluent valves. For example, each dispensing module may include a switch or valve that an operator manually toggles so as to choose the diluent that will be used by that dispensing module.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. All embodiments need not necessarily achieve all objects or advantages identified above. The features of the embodiments described herein may be combined in all possible combinations of methods and apparatuses.

The invention claimed is:

1. A beverage dispenser, comprising:

a housing comprising multiple pour stations, each pour station comprising a separate set of corresponding components located within the housing, each set of corresponding components comprising an installation position configured to receive and hold a fluid container, a data reader configured to scan indicia of a fluid container placed at the installation position, a fluid conduit locatable in fluid communication with an interior of a fluid container held at the installation position, a meterable flow control device in fluid communication with the fluid conduit and electrically controllable to output a fluid at a selected one of multiple different flow rates, and first and second electrically-operated diluent valves; and a controller located within the housing and in electrical communication with the data readers, the meterable flow control devices, the first diluent valves and the second diluent valves, wherein the controller is configured to simultaneously execute an independent program thread with regard to each of the installation positions, and wherein the controller is configured to, as part of each programming thread and using the components corresponding to the installation position with regard to which the programming thread is executed, receive first data from the data reader indicating a first beverage concentrate, in response to a dispense signal, and based on the first data, activate the meterable flow control device at a first flow rate, open the first diluent valve, and not open the second diluent valve, receive second data from the data reader indicating a sanitizer, in response to a dispense signal, and based on the second data, activate the meterable flow control device at a second flow rate, open the second diluent valve, and not open the first diluent valve, receive third data from the data reader indicating a second beverage concentrate, in response to a dispense signal, and based on the third data, activate the meterable flow control device at a third flow rate, open the second diluent valve, and not open the first diluent valve.

2. The beverage dispenser of claim 1, wherein each of the meterable flow control devices comprises a variable flow pump.

3. The beverage dispenser of claim 2, further comprising a fluid container configured for placement in one of the installation positions and having an indicia region at a location scannable by the data reader corresponding to the one of the installation positions when the fluid container is placed therein, the indicia region containing indicia that is both human-readable and machine-readable.

4. The beverage dispenser of claim 3, wherein the indicia comprises human language characters.

5. The beverage dispenser of claim 4, wherein the indicia comprise human language characters imprinted with magnetic ink.

6. The beverage dispenser of claim 5, wherein the fluid container contains the first beverage concentrate and the indicia identify the first beverage concentrate, and further comprising:

an additional fluid container configured for placement in the one of the installation positions and containing the sanitizer, the additional fluid container having an indicia region at a location scannable by the data reader corresponding to the one of the installation positions when the additional fluid container is placed in the one of the installation positions, the additional fluid container indicia region containing additional container indicia identifying the sanitizer.

7. The beverage dispenser of claim 1, further comprising:

a fluid container configured for placement in one of the installation positions and having an indicia region at a location scannable by the data reader corresponding to the one of the installation positions when the fluid container is placed therein, wherein the fluid container contains the first beverage concentrate; and an additional fluid container configured for placement in the one of the installation positions and containing the sanitizer, the additional fluid container having an identification indicia region at a location scannable by the data reader when the additional fluid container is placed in the one of the installation positions.

8. The beverage dispenser of claim 1, wherein the second beverage concentrate is different from the first beverage concentrate and the second flow rate is different from the first flow rate.

9. The beverage dispenser of claim 1, wherein the data reader is configured to scan indicia that comprises human language characters.

10. The beverage dispenser of claim 1, wherein the multiple pour stations comprises more than two pour stations.

11. The beverage dispenser of claim 1, wherein the multiple pour stations comprises four pour stations.

12. The beverage dispenser of claim 1, further comprising a merchandising panel positioned on a front of the housing and having light emitting diodes.

13. The beverage dispenser of claim 1, wherein each of the installation positions is configured to receive and hold a bag-in-box type fluid container.

* * * * *